(12) United States Patent
Nakamura et al.

(10) Patent No.: US 6,457,126 B1
(45) Date of Patent: Sep. 24, 2002

(54) STORAGE DEVICE, AN ENCRYPTING/DECRYPTING DEVICE AND METHOD OF ACCESSING A NON-VOLATILE MEMORY

(75) Inventors: Yasuhiro Nakamura, Tokyo; Seiji Hiraka, Iwate; Kazunori Asada; Satoshi Era, both of Hokkaido, all of (JP)

(73) Assignee: Tokyo Electron Device Limited, Yokohama (JP)

( * ) Notice: Subject to any disclaimer, the term of this patent is extended or adjusted under 35 U.S.C. 154(b) by 0 days.

(21) Appl. No.: 09/619,860

(22) Filed: Jul. 20, 2000

Related U.S. Application Data

(63) Continuation of application No. PCT/JP99/00170, filed on Jan. 20, 1999.

(30) Foreign Application Priority Data

Jan. 21, 1998 (JP) .......................................... 10-009303

(51) Int. Cl.[7] ................................................. G06F 1/24
(52) U.S. Cl. ...................... 713/166; 713/182; 713/184; 380/277; 380/284
(58) Field of Search ................................ 713/166, 182, 713/184, 200, 201, 183; 380/277, 278, 284

(56) References Cited

U.S. PATENT DOCUMENTS 6,158,004 A * 12/2000 Mason et al. ................ 713/200
6,212,635 B1 * 4/2001 Reardon ....................... 713/165
6,230,267 B1 * 5/2001 Richards et al. ............. 713/172

FOREIGN PATENT DOCUMENTS

| JP | 2-130044 | 5/1990 |
|----|----------|--------|
| JP | 2-235158 | 9/1990 |
| JP | 8-95490 | 4/1996 |
| JP | 8-161232 | 6/1996 |
| JP | 10-3430 | 1/1998 |
| JP | 10-3431 | 1/1998 |

* cited by examiner

Primary Examiner—Thomas R. Peeso
(74) Attorney, Agent, or Firm—Luce, Forward, Hamilton & Scripps LLP

(57) ABSTRACT

A storage device (10) has a flash memory (11), a controller (16) and a second ROM (15). In the flash memory (11), a data key is stored, which is a key unique to each storage device (10). In the second ROM (15), a system key is stored which is an encrypting key common to storage devices (10). The controller (16), when writing data, encrypts the data with the data and system keys and writes the encrypted data in the flash memory (11), and when reading data, decrypts the data with the data and system keys to output the decrypted data. The data key may be encrypted with the system key. In this case, when to write data, the controller (16) may decrypt the data key with the system key, and encrypt data with the decrypted key, and when to read data, the controller may decrypt the data key with the system key, and decrypt the encrypted data with the decrypted data key.

21 Claims, 13 Drawing Sheets

STORAGE DEVICE, AN ENCRYPTING/ DECRYPTING DEVICE AND METHOD OF ACCESSING A NON-VOLATILE MEMORY

This is a continuation application claiming priority to co-pending International Application No. PCT/JP/00170 (Publication No. WO99/38078) having an international filing date of Jan. 20, 1999 and which designates the United States, and to Japanese Patent Application No. 10-9303, filed Jan. 21, 1998, to which the International Application also claims priority; the full contents of each of these patent applications is hereby expressly incorporated by reference herein.

TECHNICAL FIELD

This invention relates to a storage device employed as an external storage device and the like of computers, etc., and more particularly to a storage device which stores data in an encrypted form.

BACKGROUND ART

As the computer technology is advancing, the necessity to protect any top secret information increases. Thus, the importance of the encryption technique, for encrypting and storing data and transmitting the data, has been enhanced. For example, in this encryption technique, an encrypting key is stored in a storage device, data is encrypted using this stored encrypting key and stored in a memory, and the data read out from the memory is decrypted using this encrypting key.

In a case where such an encrypting key is common to all storage devices, if an encrypting key corresponding to one single storage device is leaked out, any other encrypting keys corresponding to other mass-produced storage devices are to be leaked out as well. This may lead to the possibility of deciphering the stored data.

Different encrypting keys may possibly be set to the respective storage devices, however, this increases the number of manufacturing processes and the manufacturing cost of the storage devices.

The technique, for encrypting the whole data on the computer so as to store the data in a memory card and decrypting the data read out from the memory card on the computer, is also known. According to this method, if communications between the computer and the storage device is monitored, its encrypting key may be lead out.

This invention has been made in consideration of the above facts. It is accordingly an object of this invention to provided a storage device which has a function for encrypting and decrypting data and wherein top secret information, such as an encrypting key or the like, is unlikely to be leaked out.

Another object thereof is to provide a storage device whose encrypting key can not be leaked out, even if another encrypting key corresponding to another storage device is leaked out.

DISCLOSURE OF INVENTION

In order to achieve the above-described objects, a storage device for storing data, according to the first aspect of this invention, may comprise:

a rewritable non-volatile memory (11) storing data; and controlling means (12) for accessing said non-volatile memory, and said storage device being characterized in that:

a first encrypting key is stored in said non-volatile memory, a second encrypting key is stored in said controlling means and the first encrypting key is encrypted using the second encrypting key; and said controlling means includes key decrypting means (12) for decrypting the first encrypting key using the second encrypting key, writing means (12) for encrypting data using the first encrypting key decrypted by said key decrypting means, and writing the encrypted data in said non-volatile memory, and reading means (12) for reading out data from said non-volatile memory, and decrypting the read data using the first encrypting key which is decrypted by said key decrypting means.

According to this storage device, the first and second encrypting keys are employed and are separately stored. The first encrypting key is encrypted with the second encrypting key. Thus, as compared to the case where there is only one encrypting key, there is less possibility that such encrypting keys are leaked out. Hence, data is unlikely to be stolen.

Particularly, because the first encrypting key is stored in the rewritable non-volatile memory, the first encrypting key may be prepared uniquely for each device or for every certain number of devices. Therefore, even if the second encrypting key is lead out, it is difficult to decipher the entire data stored in all storage devices.

The non-volatile memory is so prepared as to store data. Thus, even if the first encrypting key stored therein, there is no increase in the cost performance.

The second encrypting key is common to a plurality of storage devices, and the first encrypting key is an encrypting key common to a part of said storage devices each storing the same second encrypting key or individually prepared for each of the storage devices storing the same second encrypting key. According to this structure, different encrypting keys may be prepared respectively for various devices.

The non-volatile memory may include a flash memory (11); and the controlling means may include a mask ROM (Read Only Memory) (15) storing the second encrypting key. The mask ROM is suited to be mass-produced, thus data including the second encrypting key can be manufactured at row rates. On the other hand, the flash memory is rewritable, so that different first encrypting keys can be prepared for the respective devices or for every certain number of devices, and can be recorded therein.

A password may be retrieved, and the encrypted first encrypting key may be decrypted only in a case where a proper password is input. In this case, the first encrypting key may be encrypted with the third encrypting key which is generated based on the second encrypting key and a password, and may be stored in said non-volatile memory; and the key decrypting means may include means for inputting the password, means for generating a third encrypting key based on the input password, and means (16) for decrypting the encrypted first encrypting key using the second encrypting key and the generated third encrypting key.

The key decrypting means may include a decrypting program and means (16) for executing the decrypting program; and the decrypting program may be stored in said non-volatile memory. According to this structure, the encrypting program in accordance with the password may appropriately be recorded in the non-volatile memory.

The key decrypting means, the writing means and said reading means may stores the decrypted first encrypting key, and include a volatile memory (13) which is protected from any external access. The decrypted first encrypting key may be stored in a RAM (Random Access Memory), etc., and used. If the storage contents of the RAM are to be externally read out, data stored in the non-volatile memory is to be deciphered. Thus, it is preferred that the volatile memory be protected from any external access.

The said non-volatile memory may include a flash memory (11).

The controlling means may include key generation means (16) for generating the first encrypting key, encrypting the generated first encrypting key using the second encrypting key, and storing the encrypted first encrypting key in said non-volatile memory. According to this structure, the storage device itself generates the first encrypting key, and is used in encrypting/decrypting data.

The key generation means may generate the first encrypting key based on an input password. According to this structure, it becomes even harder to specify the first encrypting key.

The second encrypting key may be an encrypting key common to the plurality of storage devices. According to this structure, the controlling means may include a mask ROM storing the encrypting key common to the plurality of devices, thereby to reduce the cost performance.

A storage device according to the second aspect of this invention may comprise:

a rewritable non-volatile memory (11) storing a first encrypting key and data; and controlling means (12) for storing a second encrypting key and accessing said non-volatile memory, and said storage device being characterized in that said controlling means includes writing means (16) for encrypting data using the first and second encrypting keys, and writing the data into said non-volatile memory, and reading means (16) for reading data from said non-volatile memory and decrypting the read data using the first and second encrypting keys, and outputting the data.

According to this structure, the data stored in the non-volatile memory is encrypted using a plurality of encrypting keys. Hence, unless both encrypting keys are lead out, the data stored in the non-volatile memory can not be decrypted. Therefore, as compared to the case where a single encrypting key is employed, top secret information may securely be stored in this structure.

Moreover, the two encrypting keys are stored separately from each other in different positions in the storage devices, thus it is difficult to specify the encrypting keys.

For example, the second encrypting key may be an encrypting key common to a plurality of storage devices, and may be stored in a read-only memory which is arranged in said controlling means; and the first encrypting key may be an encrypting key which is individually prepared or which is common to a part of the plurality of storage devices having the common second encrypting key.

Having stored the first encrypting key in the rewritable non-volatile memory, different first encrypting keys may respectively be prepared for the storage devices, for example. Having stored the second encrypting key common to the plurality of storage devices respectively in their read-only memory, the memory storing the second encrypting key may be mass-produced.

For example, the non-volatile memory may include a flash memory (11); and said controlling means may include a mask ROM (Read Only Memory) (15) which stores the second encrypting key.

A storage device according to the third aspect of the present invention may comprise:

encrypting key storage means (11) for storing an encrypted encrypting key;

a rewritable non-volatile memory (11) which stores encrypted data using the encrypting key;

controlling means which includes decrypting means (16) for decrypting the encrypting key, a volatile memory (13) which stores the encrypting key decrypted by said decrypting means, writing means (16) for externally-sent encrypting data using the encrypting key stored in said volatile memory and for writing the data in said non-volatile memory, reading means (16) for reading data from said non-volatile memory, decrypting the read data using the encrypting key stored in said volatile memory, and outputting the data; and prohibition means (16, 22, IDB, 25) for prohibiting any external access to said volatile memory, and said storage device being characterized in that the decrypted encrypting key is protected from any external access.

The encrypting key is encrypted, but decrypted when to be used, and stored in the volatile memory. Therefore, accessing this volatile memory and reading out data therefrom can cause the leaking of the encrypting key. According to this invention, however, any external access to the volatile memory is prohibited by the prohibition means, thus preventing the leaking of such key from occurring.

The prohibition means may, for example, include casing means (25) for casing said controlling means and an internal bus (IDB), which is cased in said casing means and which transmits data between said volatile memory and said decrypting means. According to this structure, the volatile memory is not accessible, thus any direct external access can not be made to this volatile memory. The bus between the decrypting means and the volatile memory is closed in, so it is also difficult to probe the data on the bus so as to determine the encrypting key.

It is preferred that the internal bus be formed independently from a data bus (DB), which transmits the encrypting key encrypted between said encrypting key storage means and said decrypting means and which transmits encrypted data between said writing means, said reading means and said non-volatile memory, and said device being so formed that the decrypted encrypting key is not output onto said data bus. According to this structure, it is preventable that the encrypting key is monitored by probing the bus which is elongated externally from the storage device.

The prohibition means may include unsealing detection means (16, 22) for detecting that the storage device is unsealed, and means (16) for erasing contents of said non-volatile memory when said unsealing detection means (16, 22) detects the unsealing of the storage device. According to this structure, any improper access to the non-volatile memory or the volatile memory can be prohibited.

A storage device according to the fourth aspect of the present invention may comprise:

a non-volatile memory (11);

key generation means (16) for generating a first encrypting key;

key storage means (15) for storing a second encrypting key;

writing means (16) for encrypting data using the first encrypting key generated by said key generation means and the second encrypting key stored in said key storage means, and writing the data into said non-volatile memory; and reading means (16) for reading data from said non-volatile memory, decrypting the data using the first and second encrypting keys, and outputting the decrypted data.

According to this structure, the storage devices itself can generate the first encrypting key. If the encrypting key is to be generated based on the user password, etc., different encrypting keys can be prepared for the respective storage devices. Thus, it becomes extremely difficult to decipher the encrypting key, enhancing the reliability of the system.

The key generation means may include means for storing the generated first encrypting key in said non-volatile memory; and said writing means and said reading means may use the first encrypting key stored in said non-volatile memory. According to this structure, at the time of data formatting, for example, the first encrypting key is generated and stored in the non-volatile memory. This first encrypting key is used again, thus achieving high speed operations.

The first encrypting means may be generated based on an input password. Having formed such a structure, identification of the first encrypting key is hardly accomplished.

The second encrypting key may, for example, be an encrypting key common to a plurality of storage devices, and may be stored in said key storage means including a read-only memory. According to this structure, the encrypting key common to the plurality of devices can be made with the mask ROM, permitting a cost reduction.

A storage device according to the fifth aspect of the present invention may comprise:

first encrypting key storage means (11) for storing a first encrypting key;

second encrypting key storage means (15) for storing a second encrypting key;

third encrypting key storage means (15) for storing a third encrypting key;

writing means (16) for encrypting data using the first to third encrypting keys stored in said first to third encrypting key storage means, and writing the encrypted data in a non-volatile memory; and reading means (16) for reading data from the non-volatile memory, decrypting the read data using the first to third encrypting keys, and outputting the data, and said storage device being characterized in that the first to third encrypting keys are separately arranged.

According to this structure, if three or more encrypting keys are employed, and are stored separately from one another, it becomes very difficult to decipher the encrypting keys.

An encrypting/decrypting device according to the sixth aspect of the present invention may comprise:

a rewritable non-volatile memory (11) in which a first encrypting key is stored;

a read-only memory (15) in which a second encrypting key is stored;

encrypting means (16) for encrypting data using the first and second encrypting keys and outputting the data; and decrypting means (16) for decrypting the encrypted data using the first and second encrypting keys and outputting the data.

According to this structure, the encrypting and decrypting of data can be performed using two encrypting keys. Besides, the second encrypting key common to a plurality of devices can be stored in the read-only memory, and individual encrypting keys can be stored in the non-volatile memory.

An accessing method of accessing a non-volatile memory, according to the seventh aspect of the present invention may comprise:

storing in a read-only memory a common encrypting key which is common to a plurality of devices;

encrypting with the common encrypting key individual encrypting keys unique to each of the plurality of devices, and storing the encrypted individual encrypting keys in a rewritable non-volatile memory;

decrypting the individual encrypting keys using the common encrypting key, encrypting data using the decrypted individual encrypting keys, and writing the encrypted data into the non-volatile memory, when writing data into the non-volatile memory; and decrypting the individual encrypting keys using the common encrypting key, decrypting data read out from the non-volatile memory using the decrypted individual encrypting keys, and outputting the decrypted data, when reading data from the non-volatile memory.

According to this accessing method of accessing the storage device, as compared to the case where only one encrypting key is prepared, the encrypting keys are unlikely to be leaked out, thus the data is unlikely to be stolen and the increase in the cost is unlikely to occur as well.

The individual encrypting keys may be decrypted only when a predetermined password is input. In this case, the individual encrypting keys are encrypted with the common encrypting key and a third encrypting key generated based on a password, and are stored in the non-volatile memory, and the method may further comprise inputting the password, generating the third encrypting key based on the input password, and decrypting the individual encrypting keys using the common encrypting key and the generated third encrypting key.

The common encrypting key and the decrypted individual encrypting keys may be protected from any external access.

According to this structure, the reliability of the system can be enhanced.

BEST MODE FOR CARRYING OUT THE INVENTION

Explanations will now be made to a flash memory as an example of a storage device according to embodiments of this invention.

Figure 1:
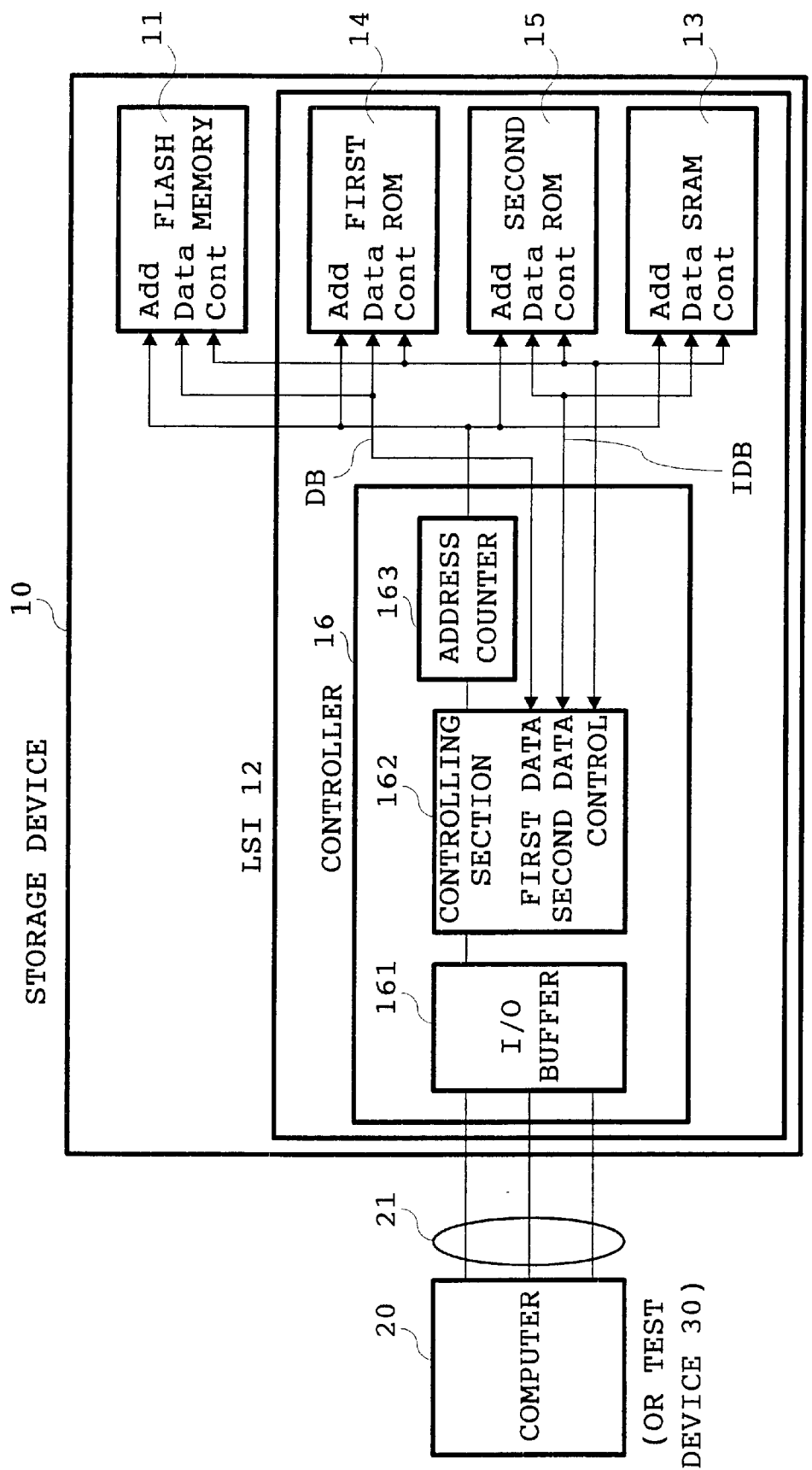
FIG. 1 is a block diagram showing the basic structures of a computer, a test device and a storage device according to the first to third embodiments of the this in invention.

FIG. 1 shows the structure of the storage device according to the first embodiment of this invention.

As described in FIG. 1, the storage device 10 comprises a flash memory 11 and an LSI 12 for accessing the flash memory 11.

The flash memory 11, as generally known, is a block erasable memory device. That is, the flash memory 11 comprises a plurality of blocks each of which comprises a plurality of memory cells, and is a memory in which data can be written in pre-erased blocks.

Figure 2:
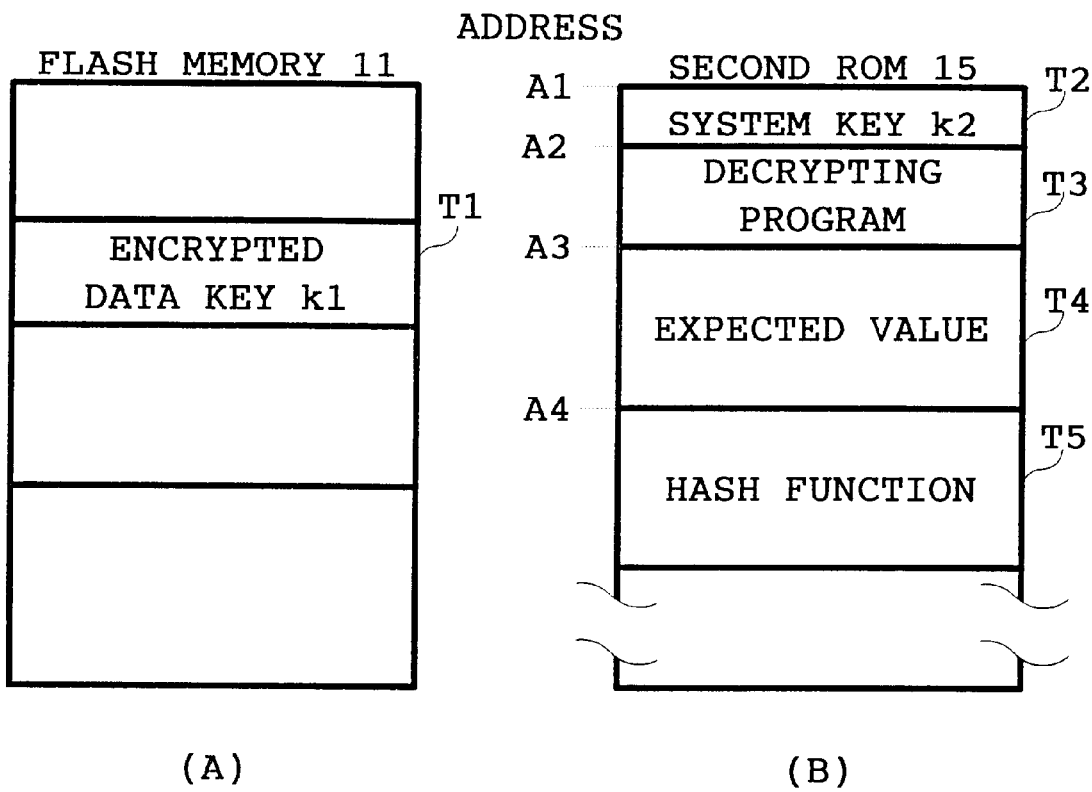
FIG. 2 is a diagram showing the internal structures of a flash memory and the second ROM.

Storage areas which the flash memory 11 has includes an area T1, as shown in FIG. 2(A). In the area T1, a data key k1 which is an encrypting key for encrypting and decrypting data is stored in advance. The data key k1 includes a prime number, etc., of a sufficiently large number of bits, and is encrypted by a system key k2, which will be described later.

Further stored in the flash memory 11 are: a file allocation table (FAT) representing the positions of files; and an empty block table, etc., representing directory information and blocks from which data has been erased.

Data which is encrypted with the data key k1 is stored in the flash memory 11 as well.

The LSI 12 carries out various controlling operations of accessing the flash memory 11, in accordance with the control of a computer 20. The LSI 12 comprises an SRAM 13, a first and second ROMs 14 and 15, and a controller 16.

The SRAM (Static Random Access Memory) 13 is a volatile high-speed memory, and has a function as a work area of the controller 16.

The first ROM (Read Only Memory) 14 is a read-only memory implemented with a mask ROM, etc., and stores operational programs for the controller 16.

The second ROM 15 is a read-only memory implemented with a mask ROM, etc. Storage areas which the second ROM 15 has include, as shown in FIG. 2(B), a system key area T2, a decrypting program storage area T3, an expected value area T4 and a hash function area T5.

The system key area T2 stores the system key k2 which is an encrypting key common to all storage devices 10. The decrypting program storage area T3 stores decrypting programs for decrypting the data key k1. The expected value area T4 stores an expected value D, as will be described later. The hash function area T5 stores a hash function.

Different physical addresses are respectively assigned to the flash memory 11, the SRAM 13, and the first and second ROMs 14 and 15.

The head address of the system key area T2 in the second ROM 15 is A1. The head address of the decrypting program area T3 is A2. The head address of the expected value area T4 is A3. The head address of the hash function area T5 is A4.

The controller 16 comprises a CPU (Central Processing Unit), a DSP (Digital Signal Processor), etc., and their peripheral circuits. The controller 16 operates in accordance with a program stored in a program area within the first ROM 14. In particular, the controller 16 carries out (1) a writing operation for writing data into the flash memory 11, (2) a reading operation for reading data from the flash memory 11, and (3) a test operation for testing the memory in the storage device 10.

The controller 16 functionally comprises an I/O buffer (interface circuit) 161, a controlling section 162 which is connected to the interface circuit 161, and an address counter 163.

The interface circuit 161 is connected to an external computer 20 and a test device 30, etc. via a bus (a data bus and a control bus) 21.

The address counter 163 is connected to address terminals Add of the respective flash memory 11, the SRAM 13, and the first and second ROM 14 and 15, via an address bus.

A control terminal of the controlling section 162 is connected to control terminals Cont of the respective flash memory 11, the SRAM 13, and the first and second ROM 14 and 15, via a control bus.

The first data I/O terminal of the controlling section 162 is connected to data terminals Data of the respective flash memory 11 and the first ROM 14, via a data bus DB. The second data I/O terminal of the controlling section 162 is connected to data terminals Data of the respective SRAM 13 and the second ROM 15, via an internal data bus IDB.

A resin, etc. is used for molding the SRAM 13, the first and second ROMs 14 and 15, the controller 16 and the internal data bus IDB, in one body. Hence, there is no chance that data stored in the SRAM 13 and the second ROM 15 are output externally from the LSI 12. In other words, the data stored in the SRAM 13 and the second ROM 15 are protected from any external access.

The storage device 10 is connected to the computer 20 or plugged in, through a cable.

Explanations will now be made to operations of the connected storage device 10 and the computer 20 (or the test device 30).

(0) When Performing Mutual Authentication

In the case where the storage device 10 is to be used, mutual authentication between the computer 20 and the storage device 10 is firstly performed.

When performing such mutual authentication, the computer 20 controls a non-illustrative display screen to display a message "input your password", for example. In response to this message, the user inputs his/her password.

The driver of the computer 20 and the controlling section 162 of the controller 16 mutually authenticate with each other based on the input password. Having achieved the mutual authentication therebetween, the storage device 10 is allowed to be used. On the other hand, having failed the mutual authentication therebetween, the controlling section 162 prohibits any later access to the storage device 10.

(1) Writing Operation

Figure 3:
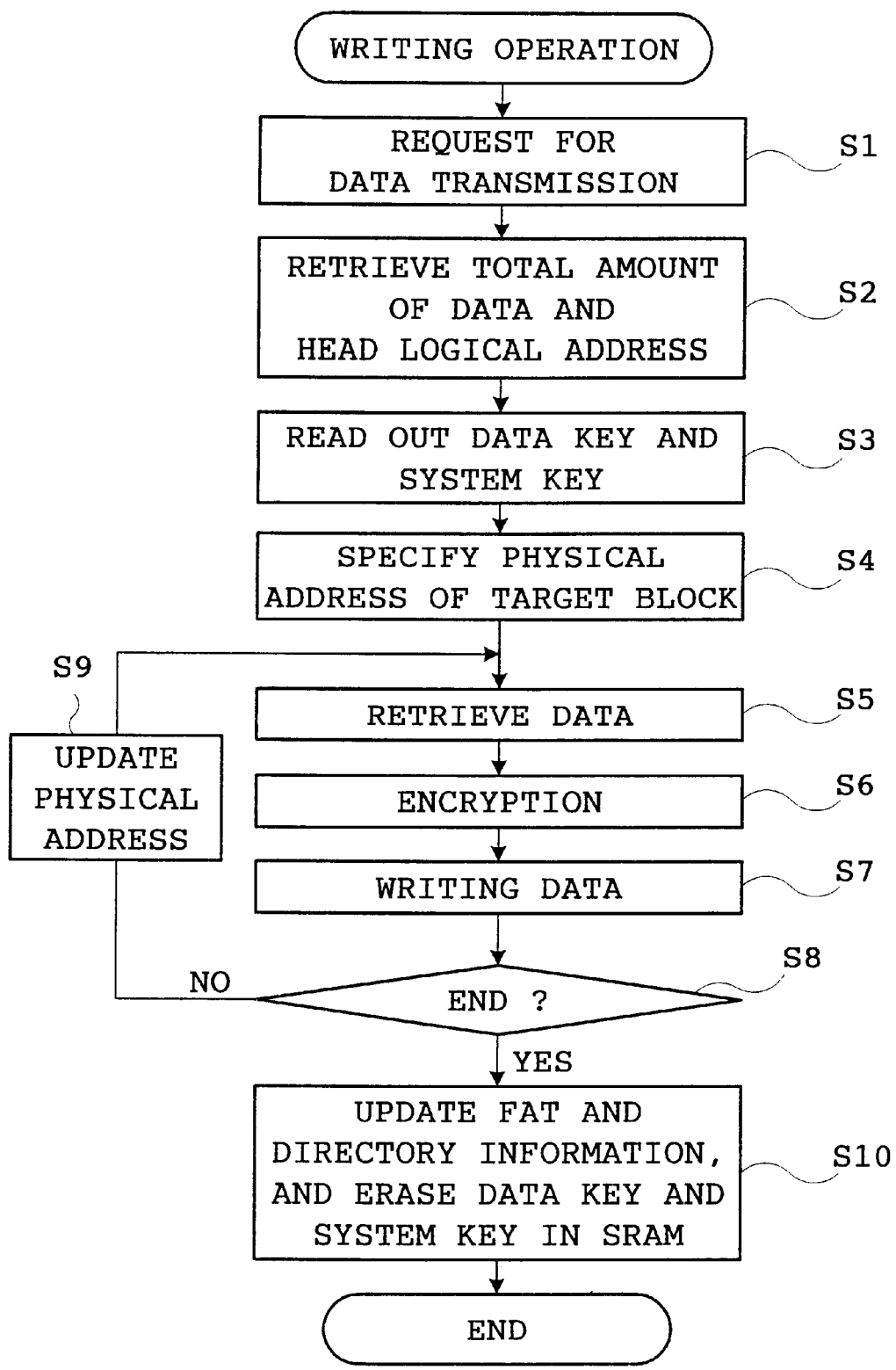
FIG. 3 is a flowchart for explaining a writing operation of writing data into the flash memory.

When writing data into the storage device 10, the computer 20 outputs a write command to the storage device 10 via the bus 21. This write command is set in the I/O buffer 161. The controlling section 162 deciphers the command and starts a process described in FIG. 3, when it determines that the command is a write command of writing data.

The controlling section 162 outputs, onto the bus 21, a command as a request for transmission of data to be written, via the I/O buffer 161 (Step S1).

In response to this request, the computer 20 sends the total amount of data to be written and the head logical address thereof. Subsequently, the computer 20 sequentially sends data to be written.

The controlling section 162 retrieves the total amount of data and the head logical address which are sent from the computer 20, via the I/O buffer 161 (Step S2).

The controlling section 162 reads out the data key k1 from the area T1 in the flash memory 11 and stores the read data key k1 in the SRAM 13. The controlling section 162 executes a decrypting program which is stored in the decrypting program area T3, decrypts the data key k1 in the SRAM 13 using the system key k2, and generates the data key k1 in the plaintext form. Further, the controlling section 162 stores the generated data key k1 in the SRAM 13 (Step S3).

Then, the controlling section 162 refers to the empty block table stored in the flash memory 11, and specifies a target empty block into which data is to be written. The controlling section 162 sets a physical address of the target empty block into the address counter (Step S4).

On the other hand, the computer 20 sequentially outputs data to be written onto the data bus 21.

The controlling section 162 receives data which are sent from the computer 20 (Step S5). The controlling section 162 encrypts the received data using the data key k1, in the plaintext form, which is stored in the SRAM 13 (Step S6).

The controlling section 162 outputs a write control signal to the control bus, and outputs the encrypted data to the data bus DB. The encrypted data output to the data bus DB is written in a position within the flash memory 11 which position is specified by the address counter 163 (Step S7).

The controlling section 162 determines whether a process necessary for handling the entire data is completed (Step S8). When determines that the process is not completed, the controlling section 162 updates the address counter 163 (Step S9), and the flow returns to Step S5. In Step S5, following data is retrieved, encrypted, and written into the following storage area within the flash memory 11.

In the case where the present target block into which data is to be written is full, in Step S9, the following empty block is selected. Then, a physical address of the selected empty block is set in the address counter 163, and data is written in the following empty block.

After the data is completely stored, the controlling section 162 updates the FAT, the directory information and the empty block table, etc. which are stored in the flash memory 11. Further, the controlling section 162 erases the data key k1 stored in the SRAM 13 (Step S10), and the process ends.

(2) Reading Operation

In the case where data is read out from the storage device 10, the computer 20 outputs a read command to the storage device 10 via the bus 20.

Figure 4:
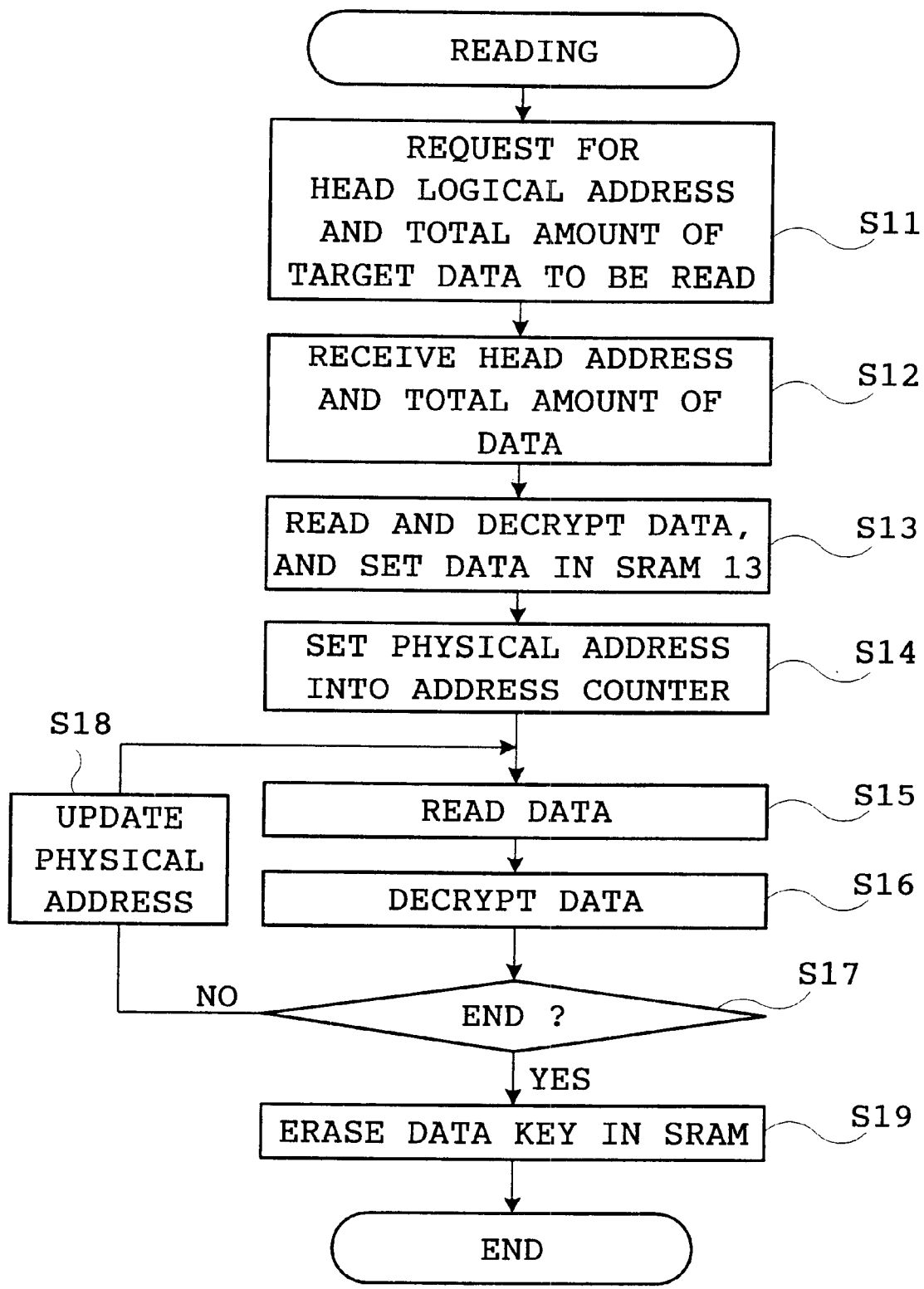
FIG. 4 is a flowchart for explaining a reading operation of reading data from the flash memory.

When the read command is set in the I/O buffer 161, the controlling section 162 deciphers this command. When it is determined that this read command is a read instruction to read data, the controlling section 162 starts a process described in FIG. 4.

The controlling section 162 outputs a command as a request for the head logical address and transmission of the total amount of data to be read, to the bus via the I/O buffer 161 (Step S11).

In response to this request, the computer 20 sends to the controller 16 the head address (logical address) of the data to be read and the total amount thereof via the bus 21.

The controlling section 162 receives the head address and the total amount of the data via the I/O buffer 161 (Step S12).

Then, the controlling section 162 executes the decrypting program stored in the decrypting program area T3. In accordance with the decrypting program, the controlling section 162 reads out the encrypted data key K1 from the data key area T1 in the flash memory, decrypts the read data key K1 using the system key k2, generates the data key K1 in the plaintext form, and stores the generated data key K1 in the SRAM 13 (Step S13).

The controlling section 162 determines a physical address at which a file (data) to be read is stored, based on the FAT and the directory information, etc. stored in the flash memory 11. Then, the controlling section 162 sets the determined physical address into the address counter 163, and outputs the physical address to the internal data bus IDB (Step S14).

Furthermore, the controlling section 162 outputs a read control signal, and reads the data stored at the physical address specified by the address counter 163 via the data bus DB (Step S15).

The controlling section 162 decrypts the read data using the data key K1 stored in the SRAM 13. The controlling section 162 sends the decrypted data to the computer 20 via the I/O buffer 161 and the bus 21 (Step S16).

Then, the controlling section 162 determines whether the reading of the data is completed (Step S17). In more particular, in Step S17, the controlling section 162 determines whether the total amount of the read data coincides with the total amount specified by the computer 20, for example. When determined that the reading of the data is not completed, the address counter 163 updates the physical address (Step S 18).

Subsequently, the controlling section 162 reads, decrypts and outputs data, while sequentially updates the physical address in the same manner described above.

When determined that the reading of the specified amount of data is completed, the controlling section 162 erases the data key stored in the SRAM 13 (Step S19), and the reading operation ends.

According to this embodiment, the encrypting key (system key k2) which is common to the second ROMs 15 in the plurality of storage devices 10, and different encrypting keys (data key K1) for the respective plurality of storage devices 10 are stored in the flash memory 11. The data key k1 is encrypted in advance with the system key k2. Thus, both the data key K1 and the system k2 are necessary for decrypting the data stored in the flash memory 11. Accordingly, even in the case where top secret information is stored in the flash memory 11, such information are effectively prevented from being leaked out.

Moreover, a reduction in the cost performance can be achieved, when the system key k2 common to the plurality of storage devices 10 is stored in the second ROM 15 which is implemented with a read-only memory, such as a mask ROM, suited to be mass-produced, and when the individual data keys k1 are stored in the flash memory 11 for data recording.

Further, when each data key K1 is set to each storage device 10, even if the data key K1 and the system key k2 corresponding to a particular storage device 10 are both leaked out for some reason, the decryption of data stored in any other storage device 10 can not be made. Accordingly, leakage of data can remain at the minimum (one storage device).

According to this structure, data transmission among the SRAM 13, the second ROM 15 and the controller 16 is performed via the internal data bus IDB. Thus, it is impossible to monitor data, being transmitted, externally from the LSI 12. Therefore, leakage of top secret information including the decrypted data key K1 and the decrypted system key 2 can be prevented.

(3) Test Operation

The storage device 10 is tested while being manufactured and during the shipping. The flash memory 11, the SRAM 13, and the first and second ROMs 14 and 15 are tested whether they can appropriately store data or whether they currently store data in an appropriate manner.

The second ROM 15 is implemented with a mask ROM, etc., thus it stores the system key k2 or a decrypting program at the time the testing is carried out. It is not preferred that the system key k2 or the decrypting program be leaked out even during the test.

In this embodiment, a unique test mode is employed as a test for the second ROM 15.

In the case of testing the storage device 10, the storage device 10 is connected to the external test device 30, etc., and the test device 30 sends a test command to the controller 16.

Figure 5:
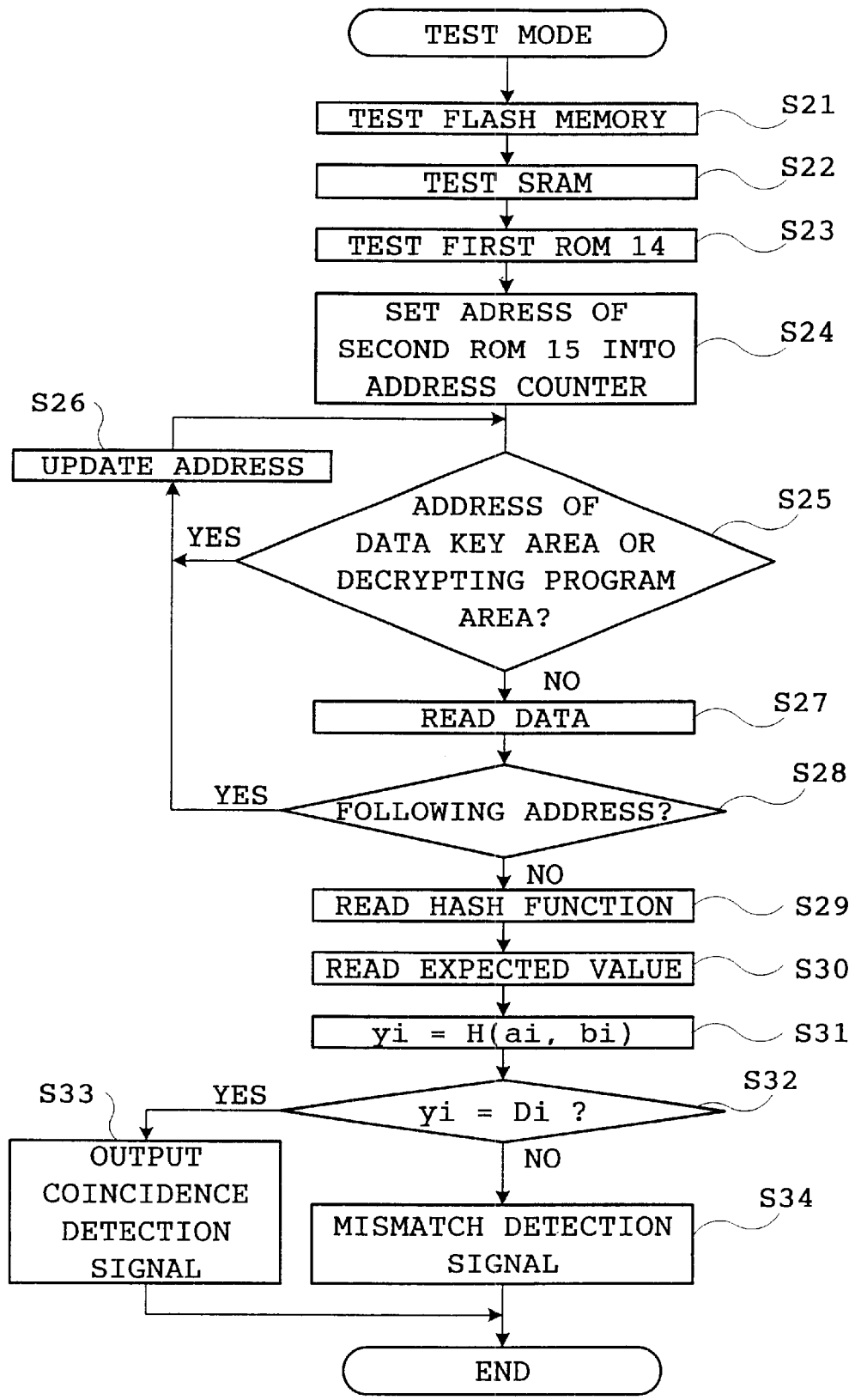
FIG. 5 is a flowchart for explaining a test operation.

In response to this test command, the controlling section 162 begins a process described in FIG. 5.

The controlling section 162 performs a test for the flash memory 11 (Step S21).

The test for the flash memory 11 is performed in accordance with the procedures, as will be described later. Particularly, the controlling section 162 once initializes the flash memory 11, and checks whether data "0" is stored in its entirety. The controlling section 162 writes "1" in the flash memory 11, and reads the written data "1", and then makes sure that the written data and the read data coincide with each other. The flash memory 11 includes an error bit with a constant probability. When an error bit is detected, the position thereof can be detected as well.

Upon completion of the test for the flash memory 11, the controlling section 162 tests the SRAM 13 (Step S22).

In particular, the controlling section 162 writes a predetermined value into all bits of the SRAM 13, while sequentially updating the address. The controlling section 162 reads out data from the SRAM 13, and controls the test device 30 to determine whether the written data and the read data coincide with each other.

Upon completion of the test for the SRAM 13, the controlling section 162 tests the first ROM 14 (Step S23). The test for the first ROM 14 includes reading of the data stored in the first ROM 14 and determining of whether the read data coincides with an expected value through the utilization of the test device 30.

Upon completion of the test for the first ROM 14, the controlling section 162 tests the second ROM 15. The test for the second ROM 15 is performed basically in the same manner as that for the first ROM 14. That is, the test includes the reading of the data stored therein, and the determining of whether new data is stored therein.

If the system key k2 and the decrypting program are read as they are, they may be leaked out to a third party, and the data key K1 and the system key k2 may be stolen or may be used for a bad purpose. Thus, another test method is now employed for testing the system key area T2 and the decrypting program area T3.

The controlling section 162 sets the head address A1 of the second ROM 15 to the address counter 163 (Step S24). Then, the controlling section 162 determines whether the address specified by the address counter 163 coincides with the address (A1≦an address specified by the address counter 163<A3) of the decrypting program area T3 (Step S25). When determined that such an address is the address of the decrypting program area T3, the address is simply updated (Step S26), and the flow returns to Step S25.

On the contrary, when determined that such an address is not the address of the decrypting program area T3, the data stored thereat is read out and sent to the test device 30 (Step S27). Further, it is determined whether the following address exists (Step S28). When determined that there exists the following address, the address is updated (Step S26), and the flow returns to Step S25.

Accordingly, the controlling section 162 sequentially reads out the data stored at or after the address A3 of the second ROM 15, and outputs the read data onto the bus 21 via the I/O buffer 161. The test device 30 determines whether the read data corresponds to a predetermined recording pattern. When determined that the read data does not correspond thereto, the test device 30 determines its address.

Upon completion of the test for the areas at or after the address A3, the system key area T2 and the decrypting program area T3 are tested.

The controlling section 162 reads out any hash function H stored in the hash function area T5 (Step S29). Then, the controlling section 162 reads out a set of expected values Di stored in the expected value area T4 (Step S30).

The controlling section 162 obtains a value, wherein data sets of predetermined bytes which are sequentially read out from the system key area T2 and the decrypting program area T3 are substituted into a hash function H (Step S31). In more particular, the controlling section 162 obtains a value H (ai, bi), wherein ai and bi are substituted in the hash function H, where data items which are read out at an i-th time, among the data sets of predetermined bytes sequentially read out from the system key area T2 and the decrypting program area T3, are assumed as ai and bi.

The controlling section 162 determines whether a value yi obtained in Step S31, i.e., yi=H (ai, bi)) coincides with an expected value Di (Step S32).

The controlling section 162 repeats the above comparison operation until the entire storage data stored in the system key area T2 and the decrypting program area T3 are read out. For example, if the total size of the system key area T2 and the decrypting program area T3 is 4 k bytes, and the data size of the data a and the data b are respectively 512 bytes, the controlling section 162 repeats the above operation four times.

When all of the calculation results yi and the entire expected values Di coincide with each other, the controlling section 162 sends a coincidence detection signal to the test device 30 (Step S33). When any one of the calculation results yi does not coincide with any of the entire expected values Di, the controlling section 162 sends a mismatch detection signal to the test device 30 (Step S34), and the test operation ends by now.

Having employed such a test mode, the memory in the storage device 10 can be examined whether to be defective or not, without leaking out the top secret information including the system key k2 or the decrypting program, etc. to the test operator.

The above-described test method is only one example. Thus, any other test method may be employed, as long as the system key k2 or the decrypted data key K1 are not output externally from the LSI 12. For example, the entire data stored in the second ROM 15 may be tested using the above hash function H. The expected value Di may be given to the storage device 10 from the test device 30.

The function H is not limited to a hash function. However, it is preferred that the function H be a one way function wherein a plurality of variables correspond to one calculation result. In such a structure, even if the expected value Di is leaked out to a third party, he/she can not identify the system key k2 and the decrypting program.

In the above explanations, the controlling section 162 sequentially writes and reads data in the test mode. However, when the test mode is set, the storage device 10 may directly connect the external bus with an internal bus until the test mode is cancelled. Further, the test device 30 may have such a structure that it can directly access each memory.

Figure 6:
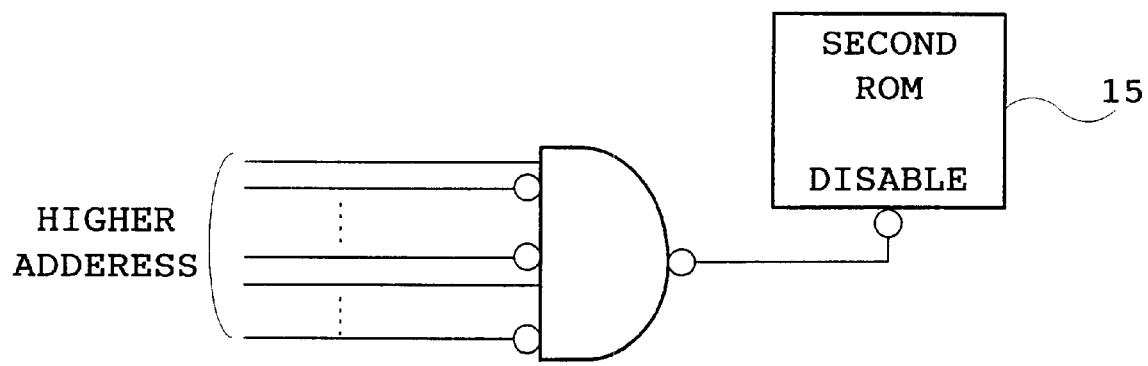
FIG. 6 is a block diagram for explaining an example of the structure, wherein any access to an area for storing secret information is prohibited.

In such a case, when the system key area T2 and the decrypting program area T3 are addressed, it is preferred that the second ROM 15 be set in a disable state, and that an address signal be masked in order not to accept (to prohibit) any external direct access. Particularly, as described in FIG. 6, an address signal at a high level may be decoded.

In the above-described embodiment, while writing data into the flash memory 11 or reading data from the flash memory 11, the data key K1 in the plaintext form is stored in the SRAM 13. In such a state, if an operational clock is stopped, the operational state enters a test mode, and if the data stored in the SRAM 13 is read out, the data key K1 may possibly be leaked out to a third party.

Figure 7:
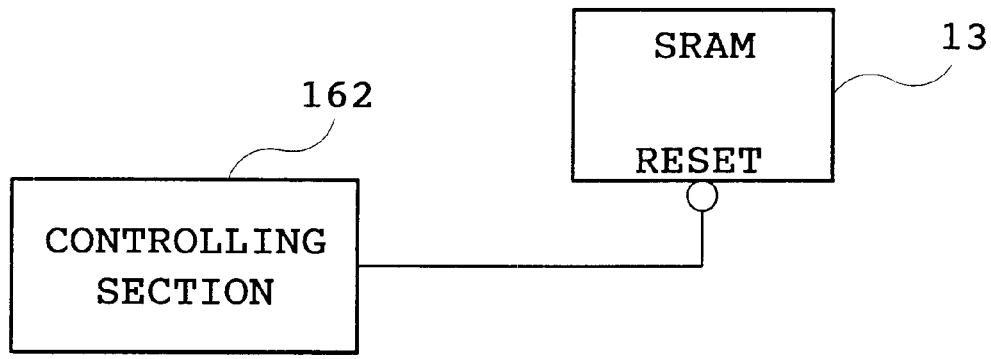
FIG. 7 is a diagram showing an example of the structure, wherein the storage contents of an SRAM are reset in a test mode.

Therefore, as described in FIG. 7, when an instruction of a test mode is sent, the controlling section 162 may send a reset signal to the SRAM 13 which then may be reset. In this case, for example, after the SRAM 13 is reset, the reset signal may be OFF, so that a test in accordance with an external control can be carried out.

Second Embodiment

In the first embodiment, in the case where the system key k2 is leaked out, the data key k1 can be decrypted using the system key k2. It is also possible to structure the storage device wherein a data key can not be decrypted only by referring to the system key k2. The second embodiment having such a structure will now be explained.

The basic structure of the storage device according to the second embodiment is the same as that described in FIG. 1. In the structure, the data key K1 is stored in the data key area T1 in the flash memory 11.

It should be noted that the data key K1 stored in the data key area T1 has been encrypted using, as an encrypting key, a value which has been obtained in combination with the system key k2 and a predetermined value RN. This predetermined value RN is a value generated by one type of a random number generation program, in which an output value is dependent on an initial value. A password PW for deciphering an encrypting code is used as the initial value.

Figure 8:
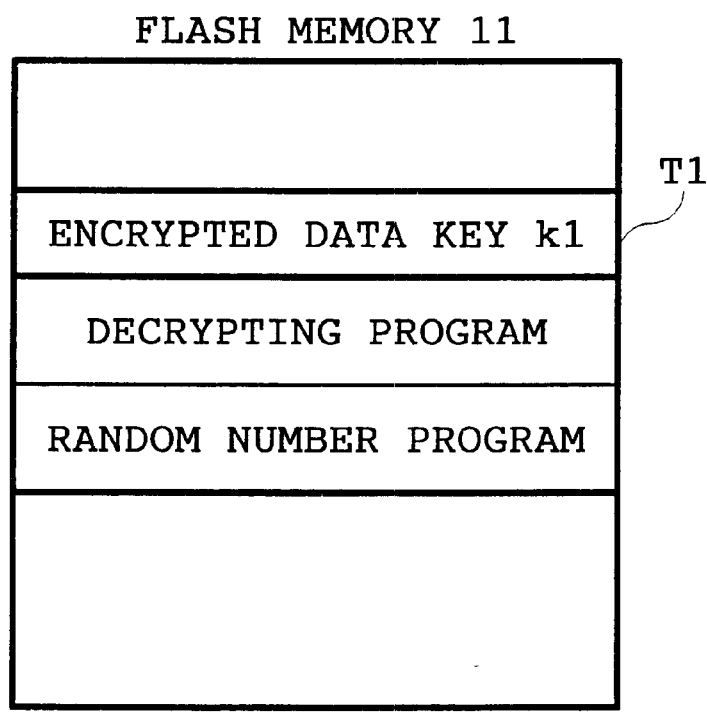
FIG. 8 is a diagram showing the structure of a flash memory included in a storage device according to the fourth embodiment of the this invention.

As illustrated in FIG. 8, stored in the flash memory 1 are an decrypting program and a random number program. The decrypting program is one for decrypting the data key K1 based on the password PW. The random number program is substantially the same as that used when generating the above predetermined value RN.

When using this storage device 10 (for example, when reading/writing data), the driver in the computer 20 sends to a user a request for a password.

Upon input of the password, the driver sends an instruction signal to instruct the decrypting of the data key K1 and the password input together with the instruction signal, to the controller 16 via the bus 21.

Figure 9:
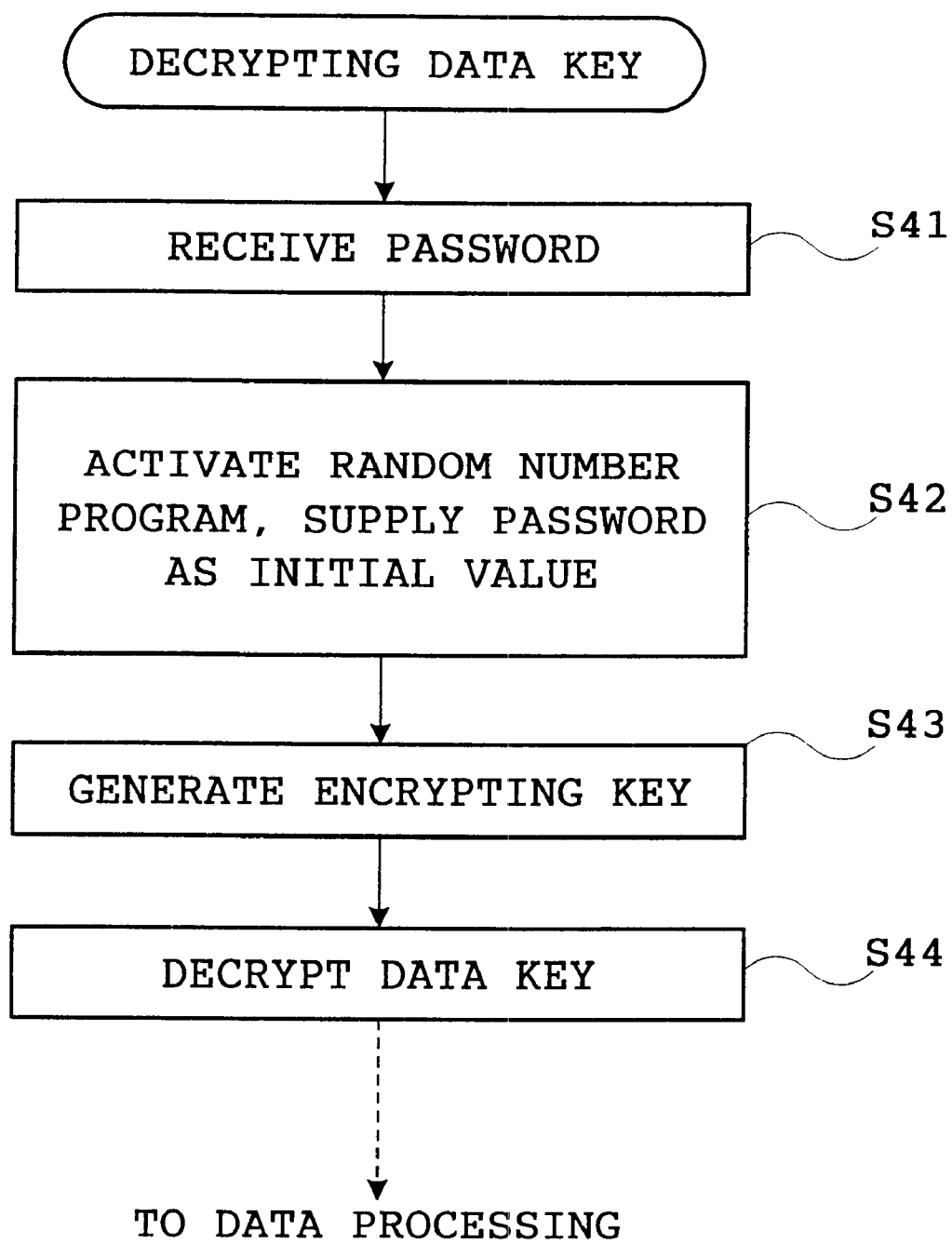
FIG. 9 is a flowchart for explaining a data key decrypting operation according to the second embodiment.

In response to this instruction signal, the controlling section 162 receives the password (Step S41 in FIG. 9), and activates the random number program. Then, the controlling section 162 sends as an initial value the received password (Step S42). This random number generation program is of a type in which an output value is dependent on an initial value, and a value to be output is determined based on an initial value.

The controlling section 162 generates an encrypting key, using the random number RN generated by the random number program in combination with the system key k2 (Step S43). The encrypting key is generated using the system key k2 and the random number RN both of which are, for example, added together ([k2+RN]), connected with each other ([k2 ; RN]), or multiplied together ([k2*RN]).

After the encrypting key is generated, the controlling section 162 encrypts the data key K1 using the generated encrypting key (Step S44).

Subsequently, the controlling section 162 encrypts data sent from the computer 20, and stores the data in the flash memory 11, using the decrypted data key K1. The controlling section 162 decrypts the data read out from the flash memory 11, and supplies the computer 20 with the decrypted data.

According to such a structure, even if the system key k2 is leaked out to a third party for some reason, unless the third party is not aware of the password, he/she can not decrypt the data key K1, and can not decrypt the data stored in the flash memory 11 either. Thus, the data stored in the flash memory 11 can be prevented from being leaked out.

It is also possible that various encrypting keys and decrypting programs for encrypting the data key K1 are prepared respectively for various storage devices 10, and are respectively stored in their flash memories 11. In this structure, different encrypting keys can be prepared for various storage devices.

In the second embodiment, for example, the decrypting program and the random number program may be encrypted using the system key k2, and can be stored in the flash memory 11. In this case, after such programs are decrypted using the system key k2, the programs are executed so as to carry out a process for decrypting the data key.

The decrypting program described in the second embodiment may have an arbitrary structure, as long as the data key K1 can be decrypted based on information specifying the user of the password, etc.

For example, a temporary encrypting key kt is generated based on the password PW, the data key K1 is encrypted using the temporary encrypting key kt, and, as a resultant encrypting code, the result kid of the encryption using the system key k2, as expressed in Equation 1, may be stored in the area T1 in the flash memory 11. The temporary encrypting key kt may be generated by generating a random number based on the password PW, for example.

$$k1d = k2\ (kt(K1))\ \ \ \ \ \ \ \ \ \ \ \ \ \ \ \ \ \ \ \ \ \ \ \ \ \ \ \ \ \ \text{(Equation 1)}$$

In this case, in order to decrypt the data key k1 stored in the area T1, the data k1d stored in the area T1 is decrypted using the system key k2 so as to generate (kt (K1 )). Then, the temporary encrypting key kt is generated based on the input password PW. The data key k1 may be decrypted using the temporary code key kt.

In the first and second embodiments, the system key k2 is stored in the second ROM 15 in the plaintext form as is. On the other hand, the system key k2 can be stored in the second ROM 15 in the state where it is encrypted using the temporary encrypting key kt. In such a case, after the system key k2 is decrypted using the temporary encrypting key kt, a process of decrypting the data key K1 is carried out.

In FIG. 1, the first ROM 14 and the second ROM 15 are separated. However, the first ROM 14 and the second ROM 15 may be formed as different areas within one single ROM. In such a case also, a data bus should be prepared, so that the data transmitted between such a ROM and the controller is not leaked out externally from the LIS 12.

It is not necessary that the system key k2 is common to all storage devices 10, thus the system key k2 may differ for every certain number of storage devices. It is not necessary that the data key K1 is prepared individually for each storage device 10, and may be common to the plurality of storage devices 10. However, in the structure wherein the system key k2 is common to the plurality of storage devices 10, it is preferred that different data keys K1 be set for the storage devices 10.

Third Embodiment

In the first embodiment, the data key K1 is stored in the flash memory 11, after being encrypted using the system key k2. In the second embodiment, the data key K1 is stored in the flash memory 11, after being encrypted using the temporary encrypted key kt.

However, the data key K1 may be stored in the flash memory 11 in the plaintext form as is. In such a case, the encrypting and decrypting of data can be performed using both the data key K1 and the system key k2. Explanations will be made to the third embodiment of the present invention below, wherein encrypting and decrypting of data are performed using both the data key and the system key k2.

The structure of the storage device 10 according to the third embodiment of the present invention is substantially the same as that according to the first embodiment as shown in FIG. 1. General data which has been encrypted is stored in the flash memory 11.

It should be noted that the data key K1 is stored as is in the plaintext form in the area T1 in the flash memory 11. Since the data key k1 is stored in the area T1 as is in the plaintext form, it is not necessary for the second ROM 15 to store the decrypting program for decrypting the data key K1, thus the decrypting program area T3 is not needed.

Operations of the storage device 10 and computer 20 (or the test device 30) both of which have the above-described structures will now be explained. An operation of mutual authentication between the computer 20 and the storage device 10 is substantially the same as that (0) of the mutual authentication which is described in the first embodiment.

A writing operation of writing data into the storage device 10 is substantially the same as that (1) of writing data which is explained in the first embodiment.

It should be mentioned that, in Step S3, the controlling section 162 simply reads out the data key K1 from the area T1 in the flash memory 11 and stores the read data key k1 in the SRAM 13. That is, decrypting of the data key k1 is not performed.

In Step S6, the controlling section 162 encrypts the data, received from the computer 20 in Step S5, using the data key K1 and the system key k2 retained in the SRAM 13.

For example, the controlling section 162 performs addition (K1+k2) of the data key K1 to the system key k2, connection (K1 ; k2), and multiplication (K1 *k2), etc., in order to generate a new encrypting key, and encrypts data using the generated key. Otherwise, the controlling section 162 encrypts data using the data key K1 , and encrypts the encrypted data using the system key k2.

In Step S10, the controlling section 162 updates the empty block table, the FAT and the directory information, and erases the data key K1 and the system key k2 stored in the SRAM 13, and the process ends.

A reading operation of reading data from the storage device 10 is substantially the same as that (2) described in the first embodiment.

It should be mentioned, however, that the controlling section 162 reads out the data key k1 in the plaintext form from the area T1 in the flash memory 11, and stores the read data key K1 in the SRAM 13 in Step S13. The controlling section 162 reads out the system key k2 from the system key area T2 in the second ROM 15, and stores the read key in the SRAM 13.

In Step S16, the controlling section 162 decrypts the data read in Step S15, using the system key k2 in addition to the data key K1 in the SRAM 13, in order to generate data in the plaintext form.

In Step S19, the controller 16 erases both the data key K1 and the system key k2 in the SRAM 13, and terminates the reading operation.

According to this embodiment, encrypting and decrypting of data are performed using the data key K1 and the system key k2. Thus, the data stored in the flash memory 11 can not be decrypted without acknowledging both of the data key K1 and the system key k2. Accordingly, as compared to the case where only a single encrypting key is used, top secret data can securely be stored in the storage device.

The data key K1 and the system key k2 are stored separately from each other in different positions in the storage device 10. Thus, it is difficult to specify an encrypting key. Particularly, the system key k2 is fixedly stored in the LSI 12, and thus can not directly and externally be retrieved. As long as different data keys K1 are respectively set to a plurality of storage devices 10, even if a data key K1 corresponding to a certain storage device 10 is leaked out, the data key K1 can not be used for decrypting data stored in any other storage devices 10. Thus, leakage of data can remain at the minimum (one storage device).

Of test operations, operations of testing the flash memory 11, the SRAM 13 and the first ROM 14 are substantially the same as the test operation (3) described in the first embodiment.

After the operations of testing the flash memory 11, the SRAM 13 and the first ROM 14 are completed, the controlling section 162 performs substantially the same procedures, for testing the second ROM 15, as those of Steps S29 to S34 in the first embodiment, so that the second ROM 15 can be tested.

In particular, the controlling section 162 sequentially reads out the set of expected values Di and the hash function H, from the expected value area T4 and the hash function area T5 in the second ROM 15. Then, the controlling section 162 obtains a value, wherein predetermined bytes of a data set sequentially read out from the second ROM 15 is substituted for the read hash function H. The controlling section 162 determines whether the obtained value yi coincides with the expected value Di.

The controlling section 162 repeats this comparison operation, until the entire data stored in the second ROM 15 are read out. In the case where the entire calculation results coincides with the entire expected value, the controlling section 162 sends a coincidence detection signal to the test device 30, and the test operation ends. When any one of the calculation results yi does not coincide with any of the entire expected values Di, the controlling section 162 sends a mismatch detection signal to the test device 30, and the test operation ends by now.

Having employed such a test mode, the memory in the storage device 10 can be examined whether to be defective or not, without leaking out the top secret information including the system key k2, etc. to the test operator. This prevents the system key k2 from being stolen or being used for a bad purpose by the test operator, etc.

The above-described test method is only one example of test methods. Thus, any other test method may be employed, as long as the system key k2 or the decrypted data key K1 are not output externally from the LSI 12. For example, only the area, within the second ROM 15, where the top secret information is stored, i.e., the one the system key k2 is stored, may be tested using the above hash function H. In terms of the rest of areas in the second ROM 15, likewise the first ROM 14, the stored data may sequentially be read out, and respectively compared with the expected values. The expected values Di may be given to the storage device 10 from the test device 30.

Fourth Embodiment

In the third embodiment, the encrypting and decrypting of data are performed using two encrypting keys, including the data key K1 and the system key k2. However, the encrypting and decrypting can be performed using three or more encrypting keys. The fourth embodiment of the present invention, wherein three or more encrypting keys are employed, will now be described.

Figure 10:
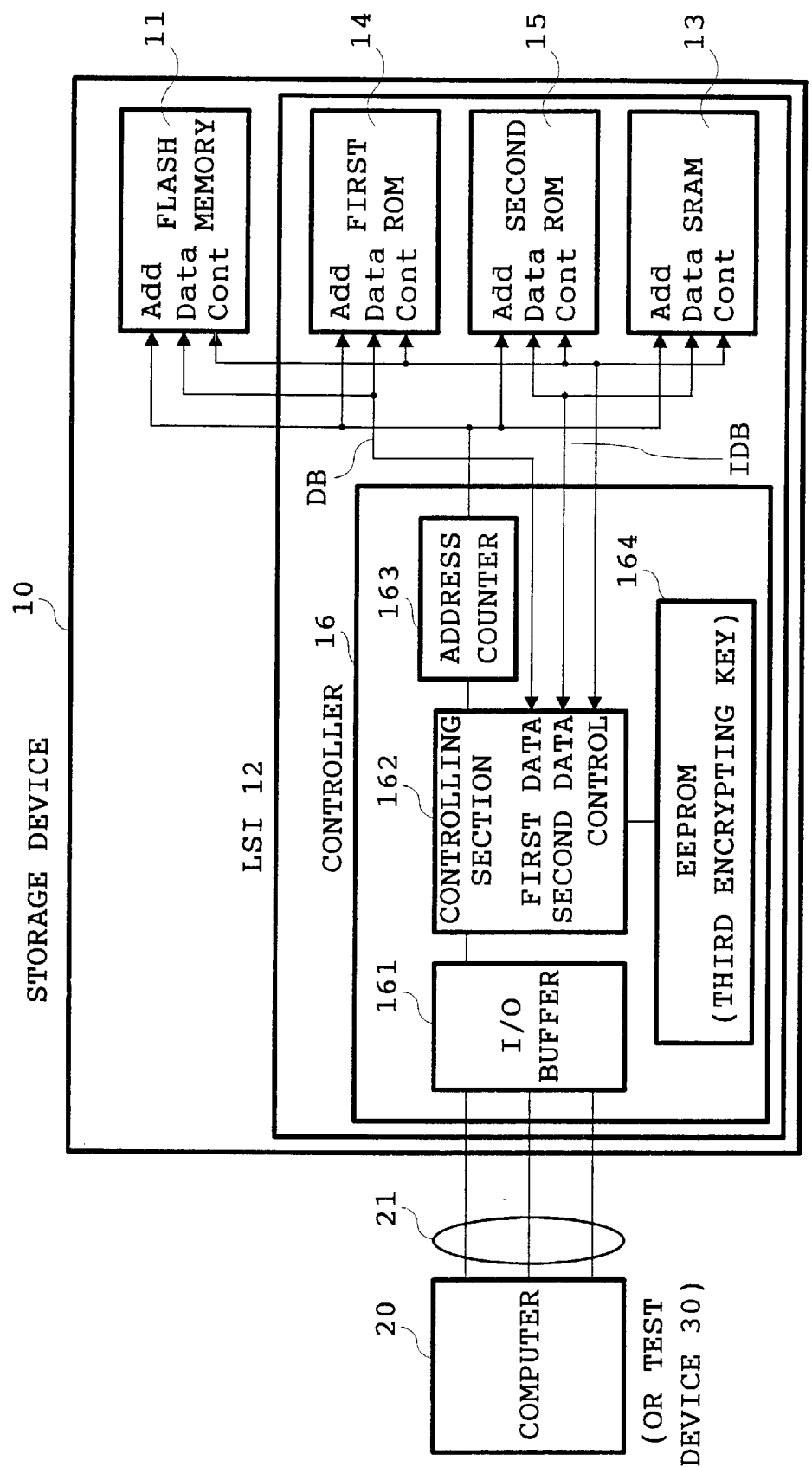
FIG. 10 is a block diagram showing the structure of a storage device according to the fourth to seventh embodiments of the this invention.
Figure 11:
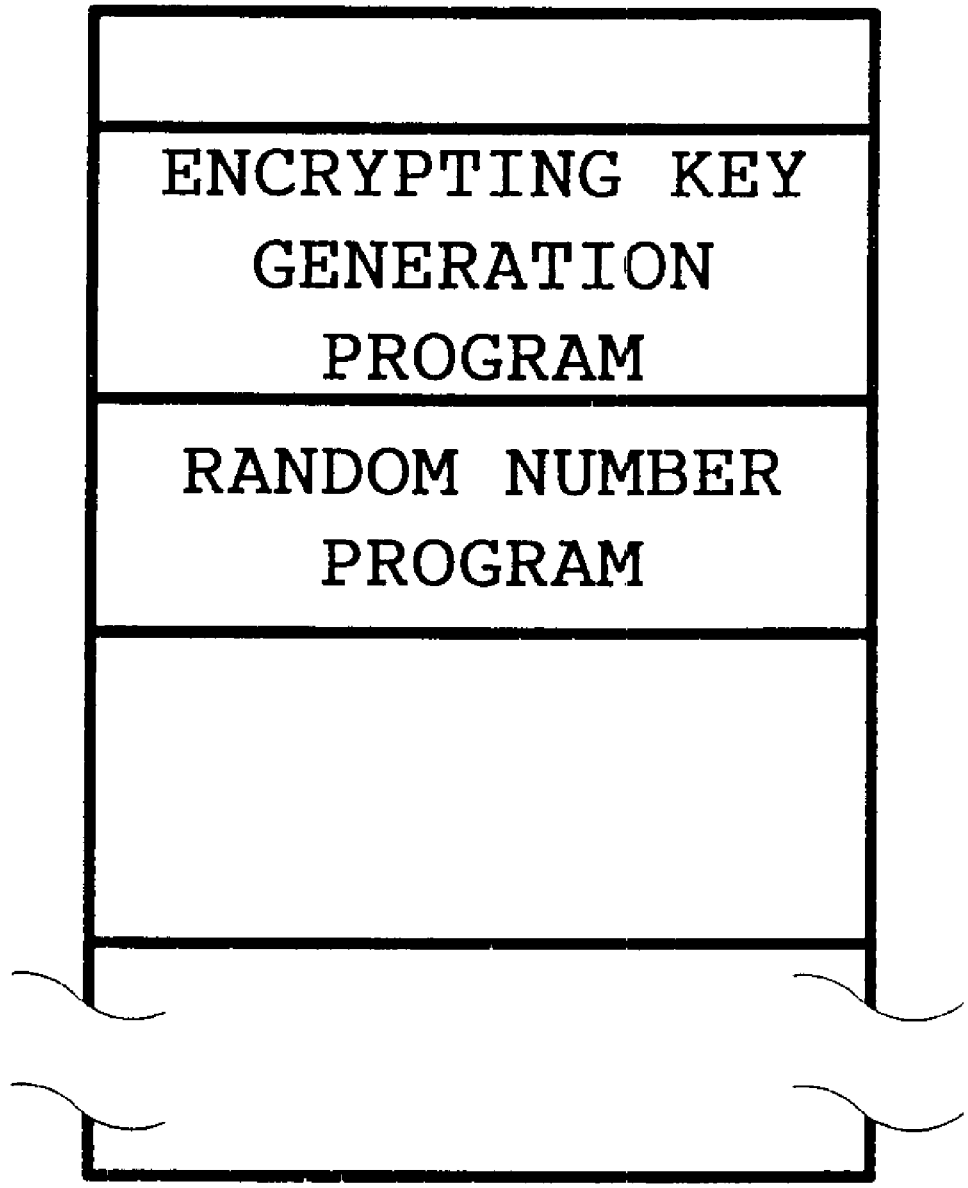
FIG. 11 is a diagram showing the structure of an EEPROM illustrated in FIG. 10.

The basic structure of a storage device according to this embodiment is substantially the same as that of the storage devices according to the first to third embodiments. However, an EEPROM 164 is mounted in the controller 16, as illustrated in FIG. 10. The EEPROM 164 stores the third encrypting key k3.

The basic operations of the storage device 10 according to this embodiment are the same as those of the storage device 10 according to the third embodiment. It should be mentioned that encrypting of data received from the computer 20 is performed using the data key K1, the system key k2 and the third encrypting key k3. Decrypting of data read out from the flash memory 11 is performed using the data key k1, the system key k2 and the third key k3 as well.

The method of encrypting data is arbitrary. The method of generating an encrypting key is also arbitrary. For example, after the data received from the computer is encrypted using the data key K1, the data may be encrypted using the system key k2, and the data may further be encrypted using the third encrypting key k3. In this case, decrypting of data is performed, by decrypting data read out from the flash memory 11 using the third encrypting key k3, decrypting the decrypted data using the system key k2, and further by decrypting the data using the data key K1.

Further, calculations of adding (K1+k2+k3) those three keys and connecting (K1 ; k2; k3) the same are performed, thereby to generate a new encrypting key. Then, encrypting of data can be performed using this newly generated encrypting key.

Accordingly, it becomes difficult to decipher the encrypted data, if the encrypting keys are dispersed and stored in different positions. This enables to provide a storage device having high reliability.

The position in which the third encrypting key k3 is stored is not limited to the EEPROM 164, thus can be an arbitrary area within the second ROM 15, for example.

Fifth Embodiment

In the third and fourth embodiments, each of the encrypting keys (the data key K1, the system key k2 and the third encrypting key k3) is stored in the memory in the plaintext form as is. However, according to the above methods, once the storage area of each of the encrypting keys is leaked out, each of the encrypting keys is read out, and the data key is decrypted. This may cause the data key to be deciphered.

The encrypting key itself may be encrypted and stored in the memory. For example, the third encrypting key k3 may be encrypted with the system key k2, and stored in the EEPROM 164. In this case, when writing and reading data, the third encrypting key k3 is decrypted using the system key k2. Moreover, encrypting and decrypting of data are performed using the decrypted third encrypting key k3.

In this structure, the third encrypting key k3 is being encrypted, but decrypted when to be used, and stored in the SRAM 13. Thus, if the SRAM 13 is externally accessed, data stored therein is read, resulting in leaking out the third encrypting key k3. However, in the physical structure described in FIG. 10, any access from any external device to the SRAM 13 is prohibited, if the SRAM 13 and the bus is covered with something or divided into parts. Thus, the third encrypting key k3 in the plaintext form is prevented from being leaked out.

Sixth Embodiment

In the third to fifth embodiments, each of the encrypting keys (the data key K1, the system key k2 and the third encrypting key k3) is stored in advance in a non-volatile memory. However, when the storage device 10 is in use, such encrypting keys may temporarily be generated. The sixth embodiment having the above structure will now be explained.

The basic structure of the storage device 10 according to this embodiment is substantially the same as that illustrated in FIG. 10. It should be mentioned that stored in the EEPROM 164 are a random number program and an encrypting key generation program each of which outputs a constant value corresponding to a set initial value.

Figure 12:
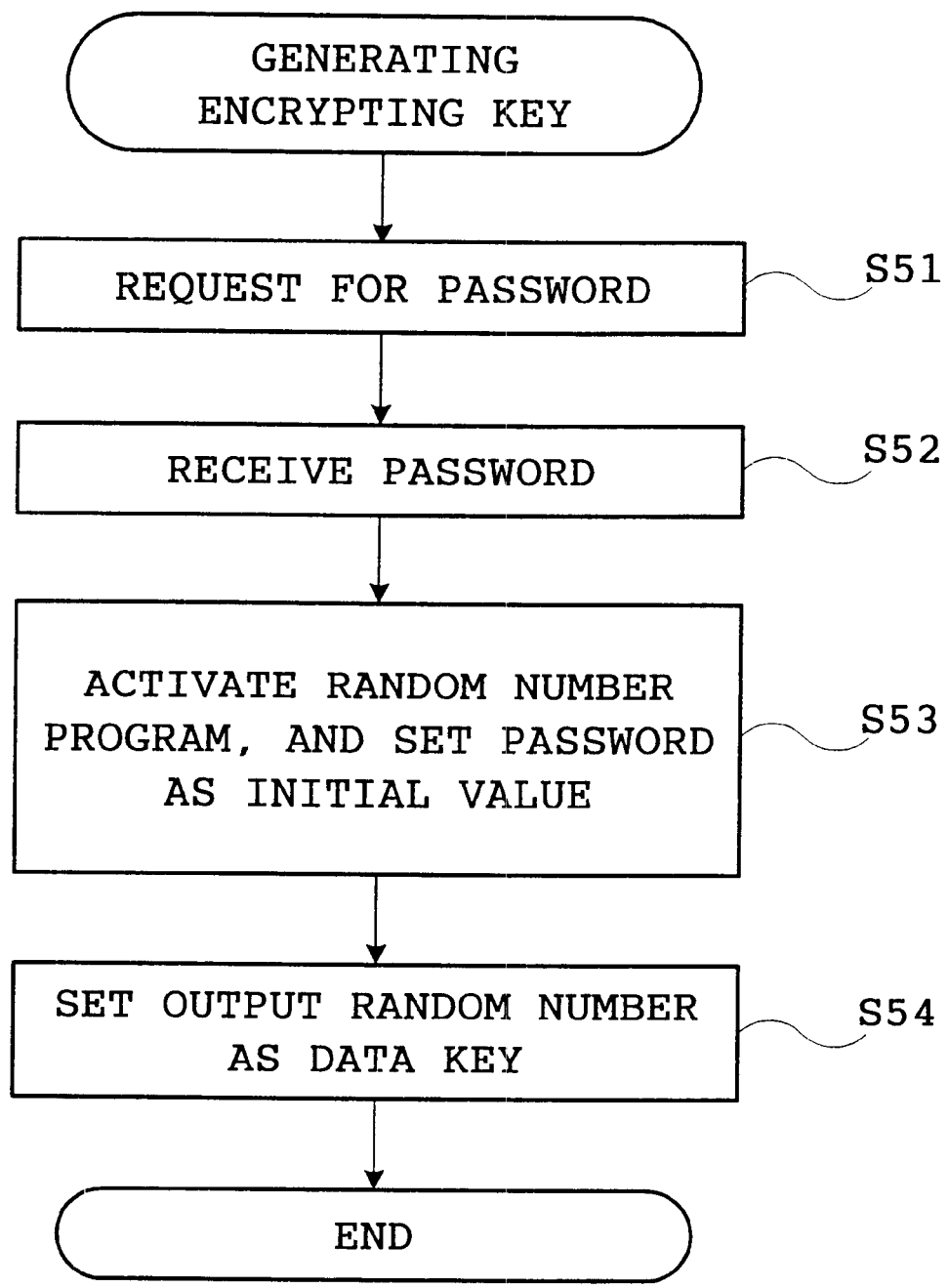
FIG. 12 is a flowchart for explaining an encrypting key generation process which is carried out by the storage device according to the sixth embodiment.

Operations of the storage device 10 in this case will now be explained with reference to FIG. 12.

When the storage device 10 is in use, the computer 20 sends an request for inputting a password to the user, in accordance with a request of the storage device 10 (or a request of the driver in the computer 20) (Step S51).

If the password is input by the user in accordance with this request (Step S52), the controlling section 162 activates the random number program, and sets the password as an initial value (Step S53). Upon execution of the random number program, a value corresponding to the initial value is generated. The controlling section 162 stores this value in the SRAM 13, and uses the stored value as the third encrypting key k3 (Step S54).

The data reading and writing operations to be carried out afterwards are the same as those of the fifth embodiment.

The timing at which the third encrypting key k3 is generated is arbitrary. The third encrypting key k3 may be generated at the timing when the storage device 10 begins to be in use, or when the flash memory 11 is accessed.

In the case where the password, set when to store data, differs from the password, set when to read data, the values of the respective third encrypting keys k3 differ. Thus, in this embodiment, unless a proper password is input, encrypting of stored data can not be deciphered. Thus, even if the system key is leaked out, the stored data can securely be retained.

The random number program may be encrypted with the data key K1 and/or the system key k2, and may be stored in the flash memory 11.

The position in which the encrypting key generation program including the random number program is stored is not limited to the EEPROM 164, and is arbitrary. For example, in the first embodiment, in place of the data key K1 or the system key k2, the encrypting key generation program may be stored and executed so as to generate and employ an encrypting key as the first or second encrypting key.

Seventh Embodiment

In the embodiments of this invention, an encrypting key which the user has generated is registered in the flash memory 11, and can be used in the following processes. The seventh embodiment having the above structure will now be explained.

The basic structure of the storage device 10 according to this embodiment is substantially the same as that illustrated in FIG. 10. In this embodiment, when the storage device 10 is to be used at the first time (for example, when the storage device 10 is to be formatted), the user connects the storage device 10 with the computer 20 having a predetermined driver function, and sends an instruction signal for instructing the setting of a data key, from the computer 20 to the storage device 10.

Figure 13:
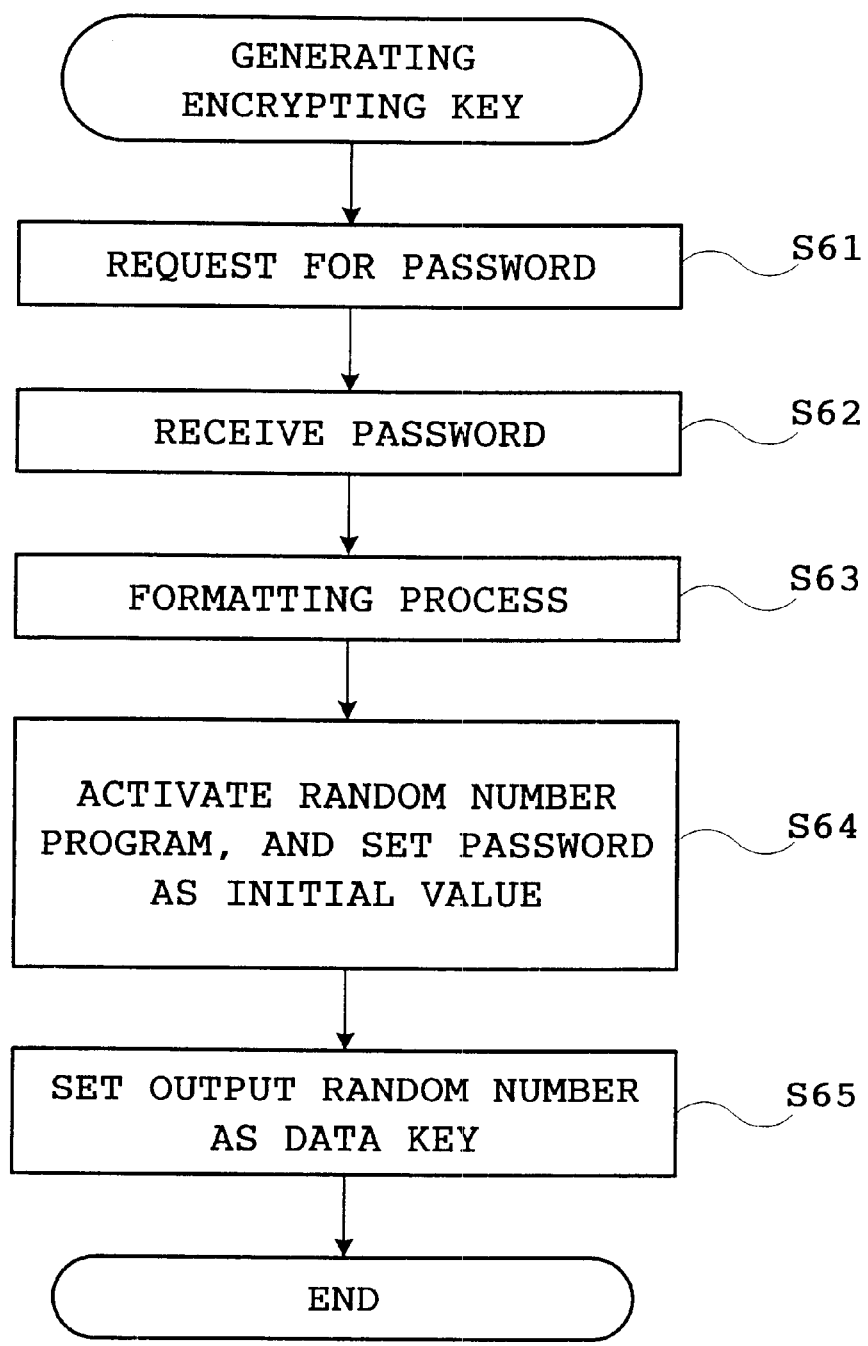
FIG. 13 is a flowchart for explaining an encrypting key generation/recording process which is carried out by the storage device according to the seventh embodiment.

In response to this instruction signal, the controlling section 162 starts the process described in FIG. 13, and requests the computer 20 for supply of a password (Step S61). If the password is supplied in accordance with the user operation from the computer in response to this request, the controlling section 162 receives the password (Step S62), and carries out a predetermined process including a formatting procedure, for example (Step S63).

After the predetermined process, the controlling section 162 activates the random number program, while referring to the supplied password (or the value indicated by the password) as an initial value (Step S64).

The controlling section 162 sets an obtained random number as a data key K1, and stores the number in the area T1 (Step S65), and the process ends.

A writing operation of writing data into the flash memory 11 in a normal state and a reading operation of reading data from the flash memory 11, etc. are performed in the same manner as those of the third embodiment. That is, the storage device 10 encrypts and decrypts data using the data key K1 and the system key k2 (in the fourth embodiment, the third encrypting keys k3 is also used).

According to this structure, a data key is generated based on the password input by the user. The data key K1 simply needs to be read out from the flash memory 11, thus achieving a short processing period for encrypting and decrypting data.

When setting the value generated by the random number program as a data key K1, this data key K1 may be encrypted using the system key k2, for example. In this case, the writing operation of writing data into the flash memory 11 being in a normal state and the reading operation of reading data from the flash memory are performed in the same manner as those of the above-described first embodiment.

Eighth Embodiment

This invention will further perfectly be structured if combined with a temper-free technique. In particular, when casing 25 of the storage device 10 is open, it is preferred that stored data be destroyed.

An example of the storage device 10 having such a structure will now be described.

Figure 14:
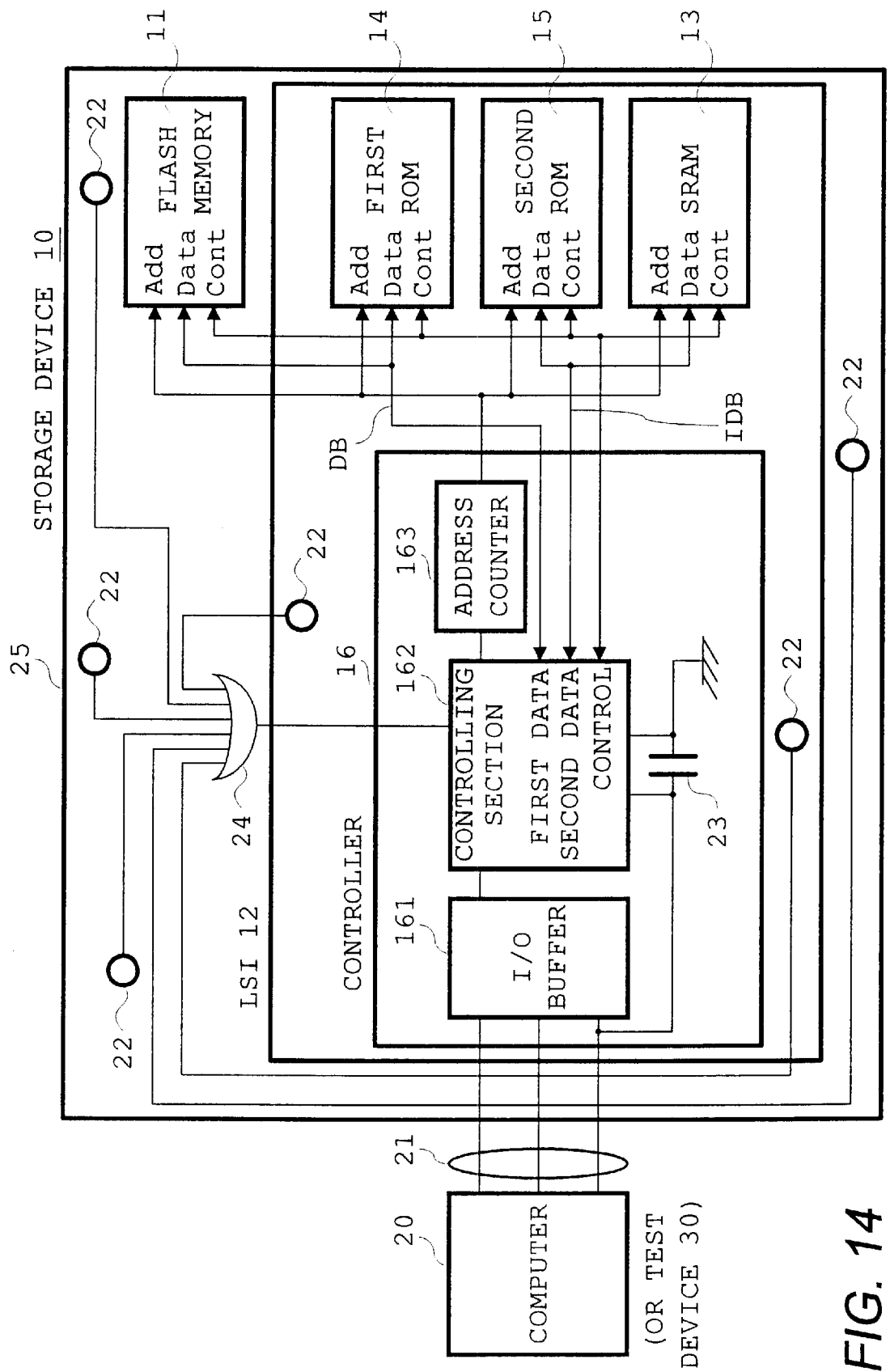
FIG. 14 is a block diagram showing the structure of a storage device according to the eighth embodiment of the this invention.

The storage device 10 according to this embodiment comprises, as illustrated in FIG. 14, micro switches 22 which are arranged in a plurality of positions within the casing 25, a capacitor (or secondary battery) 23 and an OR gate 24.

In the state where the storage device 10 is connected to the computer 20, electric power is supplied from a source line of the bus 21 to the capacitor (or secondary battery) 23, thereby to charge the capacitor 23.

The micro switches 22 are OFF in a normal state, and are ON when the casing 25 is open. If one of the micro switches 22 is ON, an ON signal is supplied to the controlling section 162 as an interrupting signal via the OR gate 24.

In response to this interrupting signal, the controlling section 162 initializes the flash memory 11 and the SRAM 13. At this time, the electric power necessary for this initialization is supplied from the capacitor (or secondary battery) 23.

According to this structure, when a part of the casing 25 is open, the controlling section 162 carries out an interrupting process. If this interrupting process is set as a process of erasing the data contents in the flash memory 11 and the data contents in the SRAM 13, those data contents in the flash memory 11 and the SRAM 13 are erased. Thus, it becomes avoidable that the top secret information stored in the flash memory 11 are leaked out to a third party.

As the flash memory 11, a memory wherein the entire data can be erased at once is preferably employed.

In the case where the data are sequentially erased in the unit of blocks, the controlling section 162 refers to an empty block table, erases blocks except any empty blocks, and finally erases the empty blocks, when to erase any arbitrary block in the flash memory. In the general DOS (Disk Operating System), when erasing a file, etc., the data may not actually be erased, by changing the head one letter to a given code. In this type of system, when erasing data, if any other data is stored in the block in which data to be erased is stored, it is preferred that the physical block be physically erased, after other data is moved (copied) into an empty block.

In the structure where the well-known tamper-free technique is employed, when the package of the LSI 12 is open, the stored data may automatically be erased, thereby enhancing the reliability of the storage device 10.

In the structure where the well-known tamper-free technique is employed, when the casing of the storage device 10 or the package of the controller 16 is open, the storage contents of the EEPROM 164 may automatically be erased. Accordingly, it is avoidable that the third encrypting key k3 is leaked out to a third party, and the reliability of the storage device is further enhanced.

This invention is applicable to a device which encrypts and outputs received data n the plaintext form, and which decrypts and outputs the received encrypted data.

The structure and operations of this device are the same as those of the above first to eighth embodiments, except the point that the process of writing data into the flash memory 11 is changed to the process of outputting (sending) data to an external device, and the process of reading data from the flash memory 11 is changed to the process of inputting (receiving) data from an external device.

This invention is not limited to the above-described first to eighth embodiments, and various changes and modifications can be made thereto.

As explained above, according to this invention, the top secret information stored in the storage device can securely be stored, and the reliability of the data contents stored in the storage device can be enhanced thereby.

What is claimed is:

1. A storage device, for storing data, comprising:
   a rewritable non-volatile memory (11) storing data; and
   controlling means (12) for accessing said non-volatile memory, and said storage device being characterized in that:
      a first encrypting key is stored in said non-volatile memory, a second encrypting key is stored in said controlling means and the first encrypting key is encrypted using the second encrypting key; and
      said controlling means includes
         key decrypting means (12) for decrypting the first encrypting key using the second encrypting key,
         writing means (12) for encrypting data using the first encrypting key decrypted by said key decrypting means, and writing the encrypted data in said non-volatile memory, and
         reading means (12) for reading out data from said non-volatile memory, and decrypting the read data using the first encrypting key which is decrypted by said key decrypting means.

2. The storage device according to claim 1, characterized in that the second encrypting key is common to a plurality of storage devices, and the first encrypting key is an encrypting key common to a part of said storage devices each storing the same second encrypting key.

3. The storage device according to claim 1, characterized in that the second encrypting key is common to the plurality of storage devices, and the first encrypting key is individually prepared for each of the storage devices storing the same second encrypting key.

4. The storage device according to claim 1, characterized in that:
   said non-volatile memory includes a flash memory (11); and
   said controlling means includes a mask ROM (Read Only Memory) (15) storing the second encrypting key.

5. The storage device according to claim 1, characterized in that said key decrypting means retrieves a password, and decrypts the encrypted first encrypting key only in a case where a proper password is input.

6. The storage device according to claim 1, characterized in that:
   the first encrypting key is encrypted with the third encrypting key which is generated based on the second encrypting key and a password, and is stored in said non-volatile memory; and
   said key decrypting means includes
      means for inputting the password,
      means for generating a third encrypting key based on the input password, and
      means (16) for decrypting the encrypted first encrypting key using the second encrypting key and the generated third encrypting key.

7. The storage device according to claim 1, characterized in that:
   said key decrypting means includes a decrypting program and means (16) for executing the decrypting program; and
   the decrypting program is stored in said non-volatile memory.

8. The storage device according to claim 1, characterized in that said key decrypting means, said writing means and said reading means store the decrypted first encrypting key, and include a volatile memory (13) which is protected from any external access.

9. The storage device according to claim 1, characterized in that said non-volatile memory includes a flash memory (11).

10. The storage device according to claim 1, characterized in that said controlling means includes key generation means (16) for generating the first encrypting key, encrypting the generated first encrypting key using the second encrypting key, and storing the encrypted first encrypting key in said non-volatile memory.

11. The storage device according to claim 10, characterized in that said key generation means generates the first encrypting key based on an input password.

12. The storage device according to claim 10, characterized in that the second encrypting key is an encrypting key common to the plurality of storage devices.

13. A storage device comprising:
   encrypting key storage means (11) for storing an encrypted encrypting key;
   a rewritable non-volatile memory (11) which stores encrypted data using the encrypting key;
   controlling means which includes
      decrypting means (16) for decrypting the encrypting key,
      a volatile memory (13) which stores the encrypting key decrypted by said decrypting means,
      writing means (16) for externally-sent encrypting data using the encrypting key stored in said volatile memory and for writing the data in said non-volatile memory,
      reading means (16) for reading data from said non-volatile memory, decrypting the read data using the encrypting key stored in said volatile memory, and outputting the data; and
      prohibition means (16, 22, IDB, 25) for prohibiting any external access to said volatile memory, and said storage device being characterized in that the decrypted encrypting key is protected from any external access.

14. The storage device according to claim 13, characterized in that said prohibition means includes unsealing detection means (16, 22) for detecting that the storage device is unsealed, and means (16) for erasing contents of said non-volatile memory when said unsealing detection means (16, 22) detects the unsealing of the storage device.

15. The storage device according to claim 13, characterized in that said prohibition means includes casing means (25) for casing said controlling means and an internal bus (IDB), which is cased in said casing means and which transmits data between said volatile memory and said decrypting means.

16. The storage device according to claim 15, characterized in that said internal bus is formed independently from a data bus (DB), which transmits the encrypting key encrypted between said encrypting key storage means and said decrypting means and which transmits encrypted data between said writing means, said reading means and said non-volatile memory, and said device being so formed that the decrypted encrypting key is not output onto said data bus.

17. A storage device comprising:

first encrypting key storage means (11) for storing a first encrypting key;

second encrypting key storage means (15) for storing a second encrypting key;

third encrypting key storage means (15) for storing a third encrypting key;

writing means (16) for encrypting data using the first to third encrypting keys stored in said first to third encrypting key storage means, and writing the encrypted data in a non-volatile memory; and reading means (16) for reading data from the non-volatile memory, decrypting the read data using the first to third encrypting keys, and outputting the data, and said storage device being characterized in that the first to third encrypting keys are separately arranged.

18. An accessing method of accessing a non-volatile memory, characterized by comprising:

storing in a read-only memory a common encrypting key which is common to a plurality of devices;

encrypting with the common encrypting key individual encrypting keys unique to each of the plurality of devices, and storing the encrypted individual encrypting keys in a rewritable non-volatile memory;

decrypting the individual encrypting keys using the common encrypting key, encrypting data using the decrypted individual encrypting keys, and writing the encrypted data into the non-volatile memory, when writing data into the non-volatile memory; and decrypting the individual encrypting keys using the common encrypting key, decrypting data read out from the non-volatile memory using the decrypted individual encrypting keys, and outputting the decrypted data, when reading data from the non-volatile memory.

19. The accessing method of accessing a non-volatile memory according to claim 18, characterized by comprising decrypting the individual encrypting keys only when a predetermined password is input.

20. The accessing method of accessing a non-volatile memory, according to claim 18, wherein the individual encrypting keys are encrypted with the common encrypting key and a third encrypting key generated based on a password, and stored in the non-volatile memory, the method being characterized by comprising:

inputting the password;

generating the third encrypting key based on the input password; and decrypting the individual encrypting keys using the common encrypting key and the generated third encrypting key.

21. The accessing method of a non-volatile memory, according to claim 18, characterized in that the common encrypting key and the decrypted individual encrypting keys are protected from any external access.

* * * * *

UNITED STATES PATENT AND TRADEMARK OFFICE
CERTIFICATE OF CORRECTION

PATENT NO. : 6,457,126 B1
DATED : September 24, 2002
INVENTOR(S) : Yasuhiro Nakamura et al.

It is certified that error appears in the above-identified patent and that said Letters Patent is hereby corrected as shown below:

Title page,
Item [73], Assignee, add -- B.U.G., Inc., Sapporo (JP) --

Signed and Sealed this

Eighth Day of February, 2005

JON W. DUDAS
*Director of the United States Patent and Trademark Office*